United States Patent [19]

Klein

[11] Patent Number: 4,676,558

[45] Date of Patent: Jun. 30, 1987

[54] BRAKE SYSTEM FOR AUTOMOTIVE VEHICLES

[75] Inventor: Hans-Christof Klein, Hattersheim, Fed. Rep. of Germany

[73] Assignee: Alfred Teves GmbH, Frankfurt, Fed. Rep. of Germany

[21] Appl. No.: 692,790

[22] Filed: Jan. 17, 1985

[30] Foreign Application Priority Data

Jan. 31, 1984 [DE] Fed. Rep. of Germany ....... 3403236

[51] Int. Cl.$^4$ .............................................. B60T 8/02
[52] U.S. Cl. ...................................... 303/114; 303/92
[58] Field of Search .............. 303/111, 114, 116, 117, 303/119, 92

[56] References Cited

U.S. PATENT DOCUMENTS

| | | | |
|---|---|---|---|
| 4,395,072 | 7/1983 | Belart | 303/92 X |
| 4,418,966 | 12/1983 | Hattwig | 303/119 X |
| 4,492,413 | 1/1985 | Belart et al. | 303/119 |

Primary Examiner—Duane A. Reger
Assistant Examiner—Matthew C. Graham

[57] ABSTRACT

A brake system for automotive vehicles comprises a dual-circuit hydraulic braking pressure generator (3) which is substantially composed of a power brake booster (4) and a master cylinder (5). Each one front wheel (VR or VL) is connected to the two brake circuits (1, 2) directly, while a rear wheel (HL or HR) is connected thereto by way of braking pressure modulator (6, 7). Further, for the purpose of pressure reduction, there is provided a pressure fluid line containing a separating valve (18) from the rear-wheel brakes (14, 15) to a pressure supply reservoir (11). The auxiliary energy supply system comprises a pressure fluid pump (8), the pressure side of which can be "shot-circuited" with the suction side by way of a value (19) for reducing the auxiliary energy transmitted onto the braking pressure generator and thus for decreasing the braking pressure at the front-wheel brakes (12, 13).

9 Claims, 6 Drawing Figures

BRAKE SYSTEM FOR AUTOMOTIVE VEHICLES

BACKGROUND OF THE INVENTION

The present invention relates to a brake system destined for automotive vehicles comprising a dual-circuit hydraulic, pedal-actuated braking pressure generator which is connected to an auxiliary energy source and the two brake circuits of which communicate each with a front wheel and a rear wheel, comprising braking pressure modulators contained in the pressure fluid lines leading to the rear wheels, and comprising pressure fluid lines leading from the rear-wheel brakes to a pressure supply reservoir and containing separating valves adapted to switch to the open position. The brake system further comprising switchable valves for reducing the boosting effect by decreasing the auxiliary energy transmitted onto the braking pressure generator and further comprising sensors and electric circuit configurations for the determination and evaluation of the wheel rotational behavior as well as for the generation of control signals which serve to influence the distribution of braking pressure onto the front wheels and the rear wheels and the braking pressure variation upon the occurrence of tendencies to lock.

A number of brake systems with slip control are known. Sensors, such as inductive transducers, serve in such systems to directly or indirectly measure the rotational behavior of the wheels, and braking pressure variation will be taken influence on, if the test values or, respectively, the time variations allow to detect an imminent locked condition. By means of modulators, which may be designed as controllable valves also, the tendency to lock will be counteracted by decreasing, maintaining constant and, in case of need, re-increasing the braking pressure at the wheel concerned or at jointly controlled wheel groups according to predetermined relations, with a view to controlling the wheel brake slip to adopt a value favorable for slowing-down, driving stability and steerability of the vehicle.

Since the adherence of the wheels on the road as well as the forces caused at the wheel during braking are dependent on various parameters, the most important ones whereof vary within very wide limits, such brake slip control apparatuses are of costly design. It is therefore the main object to be achieved in the development of brake slip control apparatuses to simplify these apparatuses and to reduce the manufacturing effort entailed, while no losses in control accuracy or only minor ones are encountered.

A brake system incorporating an auxiliary energy source is described already in German printed and published patent applications DE-OS 30 40 561 and DE-OS 30 40 562. The braking pressure generator in this system comprises a braking pressure control valve which is controlled by means of the brake pedal and to which a brake circuit is connected. Via a single-type or tandem-type master cylinder which is unitized with the braking pressure control valve and which is likewise acted upon by the brake pedal force boosted by the auxiliary energy, one or two further brake circuit(s) is/are connected. For the purpose of brake slip control, electromagnetic switching valves inserted in the hydraulic brake circuits are modulated, which valves are able to shut off the supply of the hydraulic medium to the wheel brake and thereby preclude further braking pressure increase. The braking pressure will be decreased to attain the pressure level desired by opening of an outlet towards the pressure supply reservoir. Further switching valves permit dynamic pressure out of the auxiliary energy source to enter into the working chambers of the master cylinder, as a result whereof the discharge of hydraulic medium into the supply reservoir will be compensated for, and exhaustion of the working chambers due to repeated pressure decrease will be prevented. Such systems necessitate rather high expenditure of hydraulic means.

Systems with open-center boosters are known (German printed and published patent applications DE-OS 30 40 548 and DE-OS 30 40 540), wherein the pressure fluid conduit of the pump feeding the auxiliary pressure contains a throttle valve which does not close until brake actuation, which thereby initiates pressure build-up in the auxiliary energy source and ensures brake force boosting. Apart therefrom, the design of the hydraulic unit consisting again of a brake valve and a master cylinder, as well as the arrangement of the solenoid valves which will be actuated when a control action takes is similar to the system described hereinabove.

Another problem arising in the dimensioning of brake systems is the adaptation of brake force distribution to the static and dynamic loads on the vehicle axles. Conventional brake force distributors are confined to an invariably set, pressure-responsive control. Load-responsive or deacceleration-responsive brake force control units are likewise known in various designs. All these devices permit to attain but a relatively coarse adaptation to the actual axle load distribution.

Further, a brake force distributor is known already wherein, when the vehicle is at a standstill, the static axle load distribution is measured by sensors and is delivered into a microcomputer which, in consideration of these test values and of the measured braking pressure, will modulate the brake force distribution onto the front axle and the rear axle according to a memorized mathematical relation (European patent application EP-A1 062246). Likewise such a power brake booster bears the disadvantage that only a calculated frictional value, but not the actual one prevailing at the moment the brake action takes place, is decisive for the brake force distribution. Therefore, for reliably avoiding the dangerous overbraking of the rear axle, the brake system is required to be dimensioned such that, in the majority of cases, the effect the rear axle takes in braking is less than would be possible physically. Moreover, it has to be considered that in practice the actual values most frequently differ widely from the calculated present nominal values.

The brake characteristic values assumed as being constant when dimensioning the brake force distribution and in respect of the memorized mathematical relation are subject to considerable changes due to manufacturing tolerances, variations in temperature, wear etc. For this reason, it has been proposed to ascertain the brake slip at front and rear wheels by means of wheel and vehicle sensors as well as by logic combining circuits, and to control the brake slip at the rear axle in dependence upon the brake slip of the front axle such as to ensure that with each braking action there occurs at the rear wheels approximately the same coefficient of friction as at the front wheels (German patent application P 33 01 948.7).

However, a shortcoming of such a brake force distributor is that in the case of overbraking (i.e., in the event of excessive brake application) the front wheels are the first to lock and only in the presence of higher pressure will be rear wheels follow. This is important because the locking of the rear wheels ensues great risk of skidding, while the loss of steerability due to locking of wheels is less severe compared thereto. When the brake is depressed excessively, none of the brake power boosters described prevent locking of both the front wheels and the rear wheels and therefore the vehicle is deprived of steerability and driving stability as a consequence thereof.

Therefore, a brake system system has been proposed which, on any braking action, both controls brake force distribution onto the front axle and the rear axle and prevents locking of the wheels. The hydraulic units and braking pressure modulators required for this aim will be employed for the control of the brake force distribution and also for brake slip control so that the manufacturing effort made for the brake system becomes relatively small as a whole. The brake system mentioned hereinabove and described in German patent application P 33 23 402.7 distinguishes by being particularly straightforward, while it is nevertheless able to distribute the brake force optimally onto the front wheels and the rear wheels with every braking action, what has as a result uniform adherence ability at the front and the rear axle, and in addition to prevent locking of the wheels, whereby driving stability and steerability of the vehicle are maintained even during panic stops on icy roads, etc.

However, in the event of a controlled reduction of the braking pressure at the front axle, the pressure variation at the front-wheel brakes is not entirely uniform in the brake system according to the main patent, wherein the braking pressure generator is composed of an open-center booster combined with a master cylinder and having its throttle valve direclty communicating with one of the two brake circuits. The reason therefore is to be seen in that, even when deactivating or, respectively, shortcircuiting the auxiliary energy source, the pedal force continues to act in the master cylinder circuit, but not in the circuit connected to the throttle valve. In consequence thereof, a specific residual pressure is left in the master cylinder circuit.

It is therefore an object of the present invention to improve the braking pressure variation at the front-wheel brakes, in particular during decrease of the braking pressure, or, respectively, to bring about a still closer approximation to the ideal pressure variation, without necessitating additional components at all or only a few thereof. Moreover, the behavior upon pressure failure in a front-wheel brake circuit is wished to be controllable in the desired fashion—according to the respective embodiment and the special requirements existing.

SUMMARY OF THE INVENTION

This object is achieved by an improvement upon a brake system of the type initially referred to in such a manner that the two hydraulically isolated brake circuits are interconnected between the braking pressure generator and the front-wheel brakes by a hydraulically actuated control element which compensates to a large extent or completely for braking pressure differences at the two front-wheel brakes.

That means, the invention permits to accomplish by use of one simple additional component that the same amount of braking pressure is prevailing in both front-wheel brakes during all types of braking actions, i.e., both during normal brake application and during brake slip control. Entire pressure discharge is likewise enabled, what is of significance above all in the presence of small frictional engagement or a low coefficient of brake force, respectively.

Thus, likewise braking pressure generators can be used on the inventive brake system which are not able to entirely discharge the braking pressure in both brake circuits by actuation of the valve which reduces the boosting. This applies for instance when designing the brake force generator in the fashion of an open-center booster combined with a single-type master cylinder and including a throttle valve, to which latter one of the two brake circuits communicates directly, while a pressure fluid pump is provided as the auxiliary energy source, the pressure side of which can be connected temporarily to the pressure supply reservoir through a valve adapted to switch to the opened position for the purpose of reduction of the boosting effect or, respectively, reduction of the auxiliary force transmitted onto the brake force generator.

According to another favorable embodiment of this invention, the control element is designed as a piston which is arranged slidably in a cylinder and the two end faces of which confine each one chamber connected to one of the two brake circuits, respectively.

Further, an embodiment of the invention enables coupling of the piston of the control element with a separating valve inserted in the pressure fluid line of the master cylinder circuit between the braking pressure genertor and the control element. The valve opens in the event of pressure balance or when higher pressure prevails in the second brake circuit, for example, one connected to the throttle valve.

Some additional switching elements insertable in the brake circuits for taking influence on the pressure variation, in particular in the event of pressure failure in one of the front-wheel brake circuits, and various alternatives for the generation of the control values for these components are described below.

BRIEF DESCRIPTION OF THE DRAWING

Further features, advantages and applications of the present invention will be appreciated from the following description of embodiments of this invention with reference to the accompanying drawing wherein.

DETAILED DESCRIPTION

Figure 1:
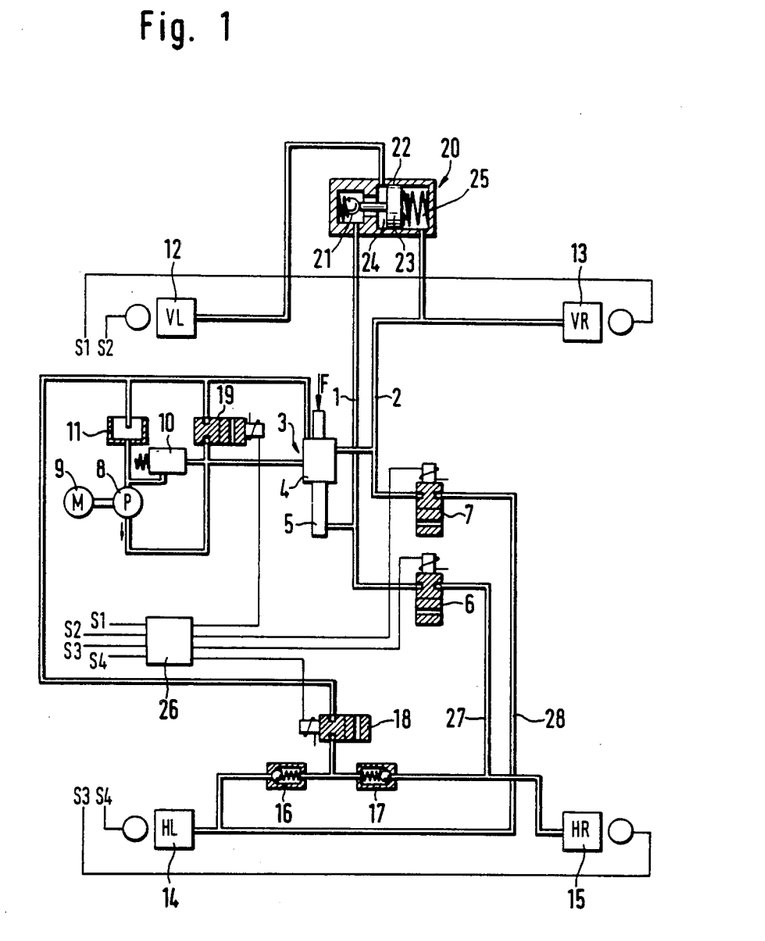
FIG. 1 is the hydraulic and electric circuit configuration of a brake system of the inventive type.

FIG. 1 displays a particularly simple brake system which is able both to control brake force distribution onto the front axle and the rear axle and to regulate the brake slip in order to avoid locking of the wheels. Herein, a hydraulic brake system comprising two brake circuits 1 and 2 is concerned which latter are each connected to the wheel brakes of a diagonal. The brake circuit 1 acts directly, apart from the normally opened separating valve described hereinbelow, on the left front wheel VL, while it acts via a braking pressure modulator 6 on the right rear wheel HR. The brake circuit 2 communicates directly with the right front wheel VR and via a braking pressure modulator 6 with the right rear wheel HR. Said brake circuit 2 communicates directly with the right front wheel VR and via a braking pressure modulator 7 with the left rear wheel HL.

A hydraulic braking pressure generator for the supply of the two brake circuits 1, 2 is as a whole designated by reference numeral 3. Said braking pressure generator 3 is composed of a power brake booster 4 and a single-type master cylinder 5. The pedal force acting on the braking pressure generator is symbolized by F.

Apt as the power brake booster 4 is e.g. an open-center booster, to the (not shown) throttle valve of which the brake circuit 2 is connected directly in a known manner.

The auxiliary energy source comprises a pressure fluid pump 8 which is mechanically coupled to an electromotive drive 9. The pressure side of the pump 8 terminates into the open-center booster 4, while the suction side of the pump leads to a pressure supply reservoir 11. A pressure-relief valve 10 which interconnects the suction side and the pressure side of the pressure fluid pump 8 serves to limit the pressure.

Besides, the rear-wheel brakes 14 and 15 are in communication with the supply reservoir 11 via check valves 16, 17 which hydraulically de-couple the rear-wheel brake circuits and via a two-way/two-position directional control valve 18 which is closed at first. Via this line, pressure reduction can be caused at the rear-wheel brakes 14, 15, as will be described later on.

Connected in parallel to inlet and outlet of the open-center booster 4 in the auxiliary energy supply circuit is a valve 19 which is closed in the inactive condition. Said two-way/two-position directional control valve 19 serves to reduce the boosting effect or, respectively, the auxiliary energy transmitted onto the brake pressure generator 3, and thereby to decrease the braking pressure in the front-wheel brakes 12, 13.

A control element 20 coupled to a separating valve 21 connects the two hydraulically isolated brake circuits 1 and 2. Said control element is composed of a cylinder 22 in which a piston 23 is slidably accommodated. The end faces of said piston confine chambers 24, 25 which are connected each to one of the two brake circuits 1, 2. In the master cylinder brake circuit 1, the valve 21 is inserted in the pressure fluid conduit leading from the master cylinder 5 to the control element 20, the said valve being opened as long as there is pressure balance in the chambers 24, 25 or the pressure in the chamber 25 is predominant.

For the determination of the wheel rotational behavoir, all wheels are equipped with sensors S1 to S4 which supply data about the wheel rotational behavior in the form of electric signals to the electronic combining and evaluating circuit 26. In this electronics 26, there will be produced the electric signals for the control of the braking pressure modulators 6, 7 and the valves 18, 19. Both the modulators 6, 7 and the valves 18 and 19 are herein electromagnetically actuatable two-way/two-position directional control valves which are closed in the initial position, i.e., in the non-energized state.

The brake system according to FIG. 1 operates as follows:

When the brake is applied by exerting a pedal force, symbolized by the arrow F, there will be instantaneous development of pressure in the two brake circuits 1, 2 which is dependent upon the pedal force F and which is boosted by the auxiliary hydraulic energy generated by the pump 8. By virtue of throttling of the delivery of pump 8 in the non-illustrated throttle within the booster 4, hydraulic pressure is built up which acts directly on the brake circuit 2 and which assists the force exerted on the piston in the master cylinder 5.

However, only after actuation or, respectively, switching-over of the two-way/two-position directional control valves 6, 7 will pressure be transmitted via the pressure fluid lines 27, 28 leading to the rear-wheel brakes 14, 15. It will be ensured by correspondingly dimensioning the electronics 26 that the braking pressure at the rear wheels follows with delay the braking pressure at the front-wheel brakes 12, 13 and is dosed in dependence upon the wheel slip determined with the aid of sensors S1 through S4. In this arrangement, the wheel slip at the rear wheels is to be less than that at the front wheels or, maximally, is to be equal to the front-wheel slip.

When an imminent locked condition is sensed at the front wheels or the rear wheels, brake slip control will commence. To interrupt further braking pressure rise at the rear axle, it s sufficient to switch the valves 6, 7 back into the closed position. If there is need for pressure decrease at the rear axle, the valve 18 will be energized so that now pressure will discharge via the check valves 16, 17 to the pressure supply reservoir 11, the lower pressure level desired being predetermined by the electronics 26 by control of the change-over times of the valve 18.

Valve 19 will be energized for pressure reduction at the front axle. Caused thereby, inlet and outlet of the auxiliary energy port of the braking pressure generator 3 will be short-circuited, so-to-speak, whereby the hydraulic pressure s able to be decreased completely in the brake circuit connected to the open-center booster 4, and to reduce to a residual amount proportional to the pedal force F in the brake circuit 2 connected to the master cylinder 5. Due to the hydraulic unbalance in the control element 20 resulting therefrom, the piston will be moved to the right—in respect of FIG. 1—and the separating valve 21 will be closed as a result. This has as a consequence isolation of the master cylinder 5 from the front-wheel brake 12 so that likewise decrease below residual presure becomes possible in the master cylinder 5.

Another advantage of the control element 20 in combination with the separating valve 21 is to be seen in that the pressure decrease at the front axle is not transmitted to the master cylinder piston. This prevents pulsation of the brake brake pedal.

Upon failure of the master cylinder circuit 1, the booster brake circuit 2 will remain fully effective.

Figure 2:
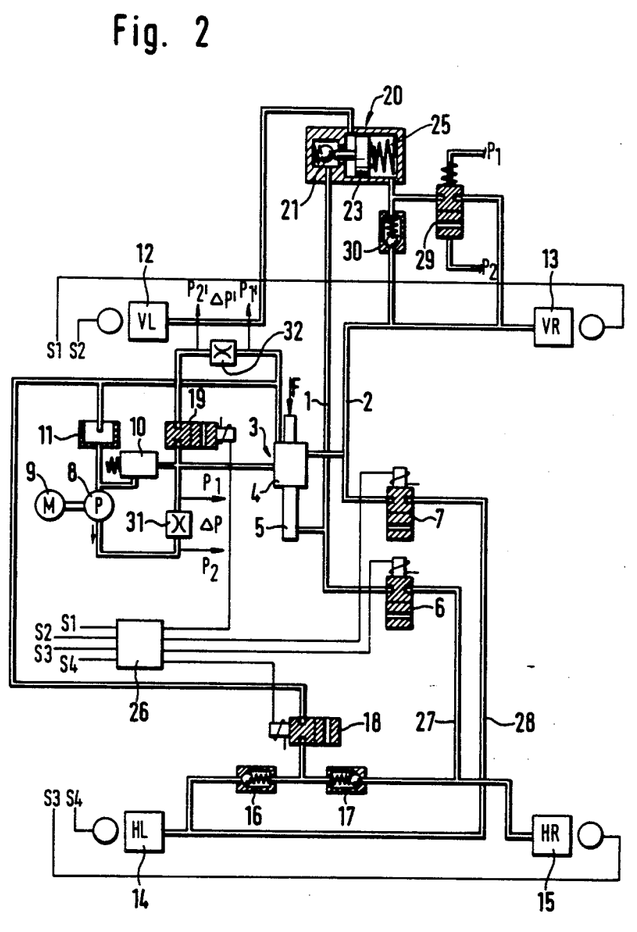
FIG. 2 is in similar representation as in FIG. 1 and further illustrating an extension according to an embodiment of the present invention.

To ensure pressure transmission to the wheel brake 12 of the left front wheel VL even upon failure of the brake circuit 2, the embodiment according to FIG. 2 provides for hydraulic connection of the control element 20 via a hydraulically actuated switching valve 29 to which a check valve 30 is connected in parallel. In the inactive position, i.e., as long as no control pressure is present at the ports $p_1$, $p_2$, the hydraulic port is closed by the valve 29. The control pressure for the actuation of the valve 29 is generated by throttles 31 or 32 inserted in the auxiliary energy supply system. The throttle 31 arranged within the main delivery of the pressure fluid pump 8 will issue upon each braking action, i.e., always when pump 8 is delivering, a signal dependent on the pressure differential p to the control inputs $p_1$, $p_2$ of the valve 29, thus switching said to assume its open position. If pump 8 does not deliver or the diaphragm 31 is not penetrated by fluid, this will result in blocking of the control element 20 because displacement of the piston 23 is not possible when the valve 29 is closed. In consequence thereof, the separating valve 21 is forced to remain open. Thus, it will be ensured that the passage from the master cylinder 5 via the brake circuit 1 to the front-wheel brake 12 remains open when the auxiliary energy supply fails.

The hydraulic conduit via the check valve 30 safeguards in any case that, upon release of the brake pedal, the piston 23 of the control element 20 is able to slide back to its initial position in which the separating valve 21 is opened.

Instead of throttle 31, likewise throttle 32 allows to be made use of for the generation of the controlling differential pressure $\Delta p'$ according to FIG. 2. A pressure differential $\Delta p'$ changing the valve 29 over will only occur at this throttle, if during brake slip control the valve 19 becomes energized because of a too high braking pressure prevailing at the front axle. Upon failure of the auxiliary energy supply and hence of the brake circuit 2, control pressure is not permitted to develop at the throttle 32 either.

Figure 3:
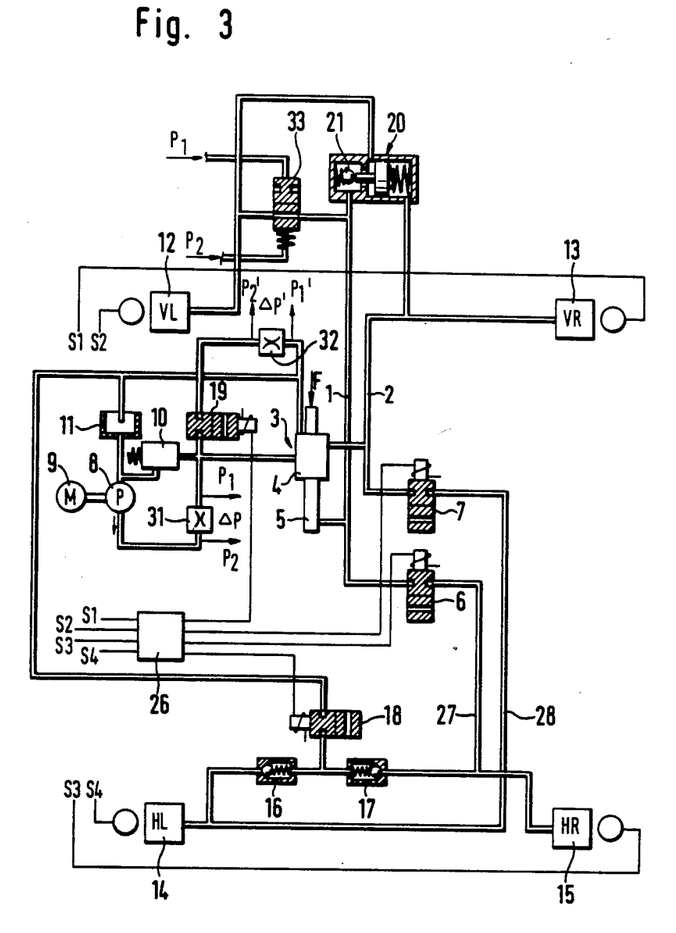
FIG. 3 is a similar representation of an alternative embodiment of the configuration according to FIG. 2.

Instead of the valve 29 according to FIG. 2, a hydraulically actuated valve 33 can likewise be inserted into the brake circuit 1 which connects the master cylinder 5 with the front-wheel brake 12, which valve 33 is however required to be switched to the open position when inactive, i.e., in the absence of control pressure. FIG. 3 shows this embodiment of the present invention. In this embodiment, the valve 33 is arranged in parallel to the pressure fluid conduit represented by the separating valve 21 and the control element 20, and connects the front-wheel brake 12 with the outlet of the master cylinder 5.

The pressure differential $\Delta p$ for the control of this valve permits to be obtained similarly to the embodiment according to FIG. 2 by means of a throttle 31 in the main delivery of the pump 8 or by means of a throttle 32 connected in series to the valve 19 short-circuiting the auxiliary energy source.

Figure 4:
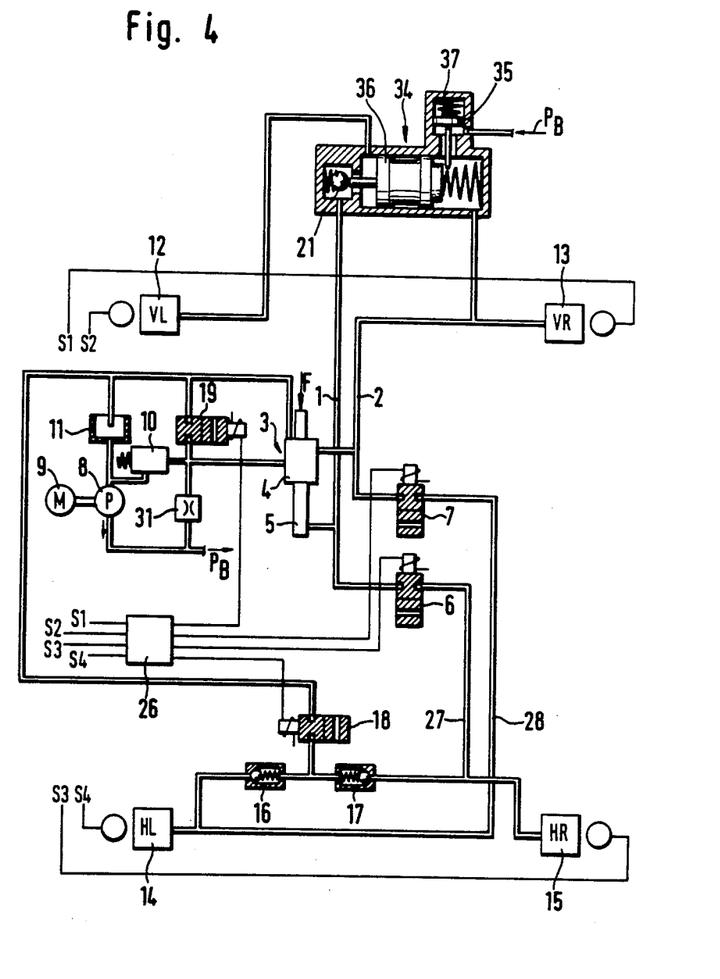
FIG. 4 is in similar representation a complementation of the embodiment of FIG. 1.

FIG. 4 shows another possibility to avoid interruption of the brake circuit 1 upon failure of the brake circuit 2 or of the auxiliary energy supply system. In this embodiment, a control element 34 which is arranged at the same location as the control element 20 and which is also coupled mechanically with the separating valve 21, is equipped with a spring-loaded catch 35 which maintains the piston 36 of the control element in the basic position as long as the dynamic pressure $P_B$ produced in turn by a throttle 31 is below a value dependent upon the spring 37 of the catch 35. Thus, the function of the control element 34 will always be ensured when there is fail-free operation of pump 8. If the auxiliary energy fails, no dynamic will develop at the throttle 31, and the catch mechanism will prevent any movement of the piston 36.

Figure 5:
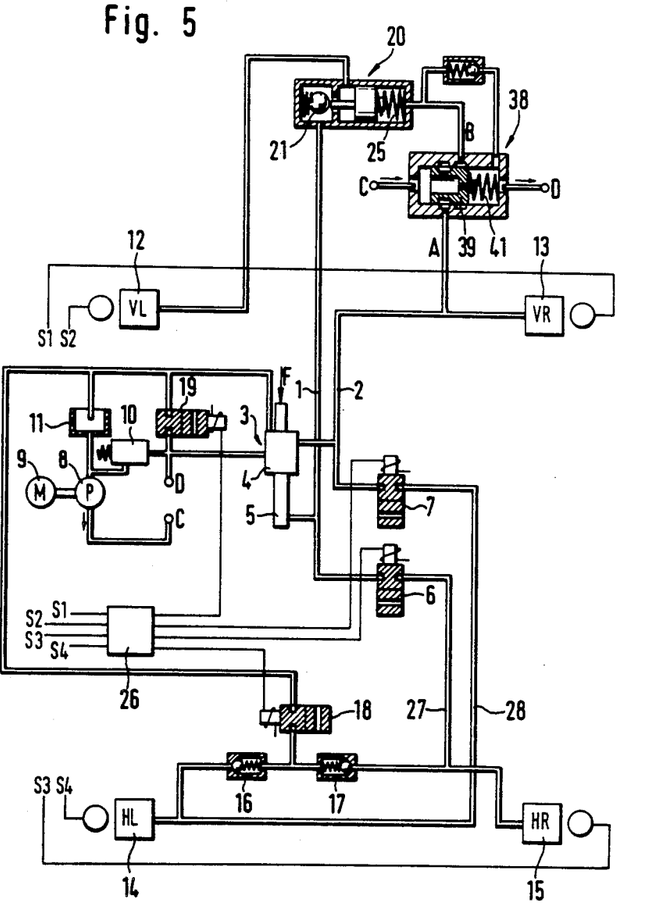
FIG. 5 is an alternative of the embodiment of FIG. 4.

In the embodiment of this invention according to FIG. 5, the brake circuit 2 communicates via a switching element 38, designed as a hydraulic slider, with the chamber 25 of the control element 20 that is opposite to the separating valve 21. The switching element 38 is composed substantially of a cylinder accommodating slidably a piston 39. This switching element is penetrated by the delivery of the hydraulic pump 8, as is indicated by the ports C, D and the arrows, and acts like a two-way/two-position directional control valve. In the inactive position, the flow from inlet A of the switching element 38 to outlet B and thus to the chamber 25 of the control element 20 is interrupted. When pump 8 is delivering, the dynamic pressure developing in a throttle in piston 39 will cause said piston 39 to displace axially in opposition to the pressure of a resetting spring 41 and to open the line from the brake circuit 2 into the control element chamber 25. Besides, the mode of function can be compared with that one of the embodiment according to FIG. 2.

Figure 6:
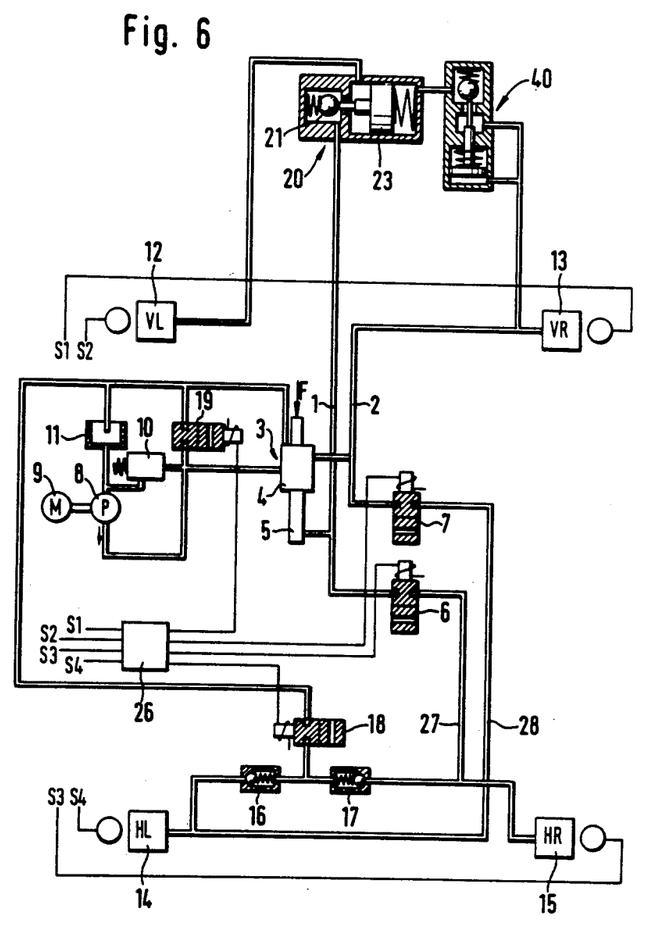
FIG. 6 is an other embodiment to complement the embodiment of FIG. 1.

Finally, the invention still affords the variant displayed in FIG. 6. In this embodiment, hydraulically de-couplable check valve 40 is inserted into the hydraulic port of the control element 20 to the right front-wheel brake VR or to the booster brake circuit 2, respectively, which check valve 40 will not open the pressure fluid passage until the pressure in the brake circuit 2 has risen in excess of a predetermined minimum pressure of e.g. 1 bar. In the event of brake circuit 2 failing now, because of failure of the auxiliary energy source for instance, the check valve 14 will close and thereby lock the piston 23 of the control element 20 so that the separating valve 21 in the brake circuit 1 remains opened. That means, the connection between the front-wheel brake 12 and the master cylinder 5 is maintained so that the front wheel V can be braked despite failure of the auxiliary energy, though without brake power boosting.

The arrangement described the last distinguishes by requiring a particularly small number of structural components.

What is claimed is:

1. A brake system for automotive vehicles comprising a dual-circuit hydraulic, pedal-actuated braking pressure generator further comprising a power brake booster and a master cylinder and which is connected to an auxiliary energy source and the two brake circuits each of which communicate with a front wheel and a rear wheel, the brake system comprising braking pressure modulators contained in pressure fluid lines leading to the rear wheels, and comprising pressure fluid lines leading from the rear-wheel brakes to a pressure supply reservoir and containing separating valves adapted to switch to the open position comprising switchable valves for reducing the boosting effect by decreasing the auxiliary energy transmitted onto the braking pressure generator, further comprising sensors and electric circuit configurations for the determination and evaluation of the wheel rotational behavior as well as for the generation of control signals for controlling on the distribution of braking pressure onto the front wheels and the rear wheels and on the braking pressure variation upon the occurrence of tendencies to lock wherein the two hydraulically isolated brake circuits (1, 2) are interconnected between the braking pressure generator (3) and the front-wheel brakes (12, 13) by a hydraulically actuated control element (20, 34) which compensates for braking pressure differences at the two front-wheel brake (12, 13), including a valve (19) wherein actuation of said valve (19) to thereby reduce the boosting effect permits reduction of the braking pressure in one of the two brake circuits (1,2) connected to the braking pressure generator (3), while reduction of braking pressure in the other brake circuit only occurs upon attainment of a residual pressure that is dependent upon the brake pedal force (F), wherein the braking pressure generator (3) is provided as a power brake booster combined with a single-type master cylinder and to which one of the two brake circuits (2) is in direct connection, and wherein a pressure fluid pump (8) is provided as an auxiliary energy source, the pressure side of which is connectable with the supply reservoir (11) by way of a valve (10) which is adapted to switch to the open position, wherein the control element (20, 34) is provided as a piston (23, 36) slidably arranged in a cylinder (22), the two end faces of said piston confining each one chamber (24, 25) communicating with one of the two brake circuits (1, 2), respectively, wherein the piston (23, 36) of the control element (20, 34) is mechanically coupled to a separating valve (21) which is inserted in terms of function into the pressure fluid line of one of the two brake circuits (1) between the braking pressure generator (3) and the control element (20, 34) the separating valve being opened in the pressure of like pressures at the two front-wheel brakes (12, 13) and in the event of higher pressure prevailing in the other brake circuit (2), the one leading directly from the braking pressure generator (3) to the front-wheel brake (13), wherein the separating valve (21) is inserted into the front-wheel brake circuit (1) connected to the single-type master cylinder (5), and wherein the front-wheel brake circuit (2) communicating with the power brake booster (4) is connected to the control element (20) by way of a hydraulically actuated valve (29) which is closed in the inactive position and which is adapted to assume its open position by a control pressure (p, p') applied thereto and delivered from the auxiliary energy circuit, and wherein a check valve (30) opening towards the control element (20) is connected in parallel to the hydraulically actuated valve (29).

2. A brake system as claimed in claim 1, wherein a hydraulically actuated valve (33) is inserted into the front-wheel brake circuit (I) communicating with the single-type master cylinder (5) between the braking pressure generating (3) and the front-wheel brake (12), in parallel to the separating valve (21) and the control element (20), said valve (33) being switched to the open position when inactive and being adapted to assume the closed position when applied by a control pressure ($\Delta p$, $\Delta p'$).

3. A brake system as claimed in claim 2, wherein the pressure ($\Delta p$, $\Delta p'$) controlling the valve (29, 33) inserted between the braking pressure generator (3) and the front-wheel brake (12, 13) is derived from the differential of pressure which is obtained by means of a throttle (31, 32) inserted in the auxiliary energy supply circuit.

4. A brake system as claimed in claim 3, wherein the throttle (31) is connected in series between the pressure side of the pressure fluid pump (8) and the braking pressure generator (3) for the purpose of generation of the control pressure ($\Delta p$) which latter switches the valve (29, 33) over which is inserted into the pressure fluid line between the braking pressure generator (3) and the front-wheel brake (12, 13).

5. A brake system as claimed in claim 3, wherein the throttle (32) is connected in series with a valve (19) which latter temporarily bridges or shortcircuits the auxiliary energy source for reduction of the boosting effect for the purpose of generation of the control pressure ($\Delta p'$) switching the valve (29, 33) over.

6. A brake system as claimed in claim 1, wherein the piston (36) of the control element (34) is adapted to be locked by a hydraulically actuated spring-loaded catch (35) in an initial position in which the separating valve (21) coupled to the piston (36) is switched to the open position, and wherein the catch (35) is disengageable by virtue of a control pressure ($p_B$).

7. A brake system as claimed in claim 6, wherein the control pressure ($p_B$) for disengagement of the catch (35) is derived from the differential of pressure which is generated by a throttle (31) arranged in the auxiliary energy supply system between the pressure side of the pump (8) and the braking pressure generator (3).

8. A brake system as claimed in claim 7, wherein the front-wheel brake circuit (2) communicating with the open-center booster (4) is connected to the control element (20) by way of a piston-cylinder unit (38) which is located in the pressure fluid conduit of the pressure fluid pump (8) of the auxiliary energy source and which is axially penetrated by pressure fluid and controlled by the pressure fluid flow; the piston (39) of said piston-cylinder unit (39) interrupting the fluid flow from the wheel brake (13) to the control element (20) in the initial position, as long as pump (8) does not deliver, while being displaceable by the pressure fluid flow in opposition to the force of a resetting spring (41) and thereby causes opening of the passage from the wheel brake (13) to the control element (20).

9. A brake system as claimed in claim 1, wherein the front-wheel brake circuit (2) communicating with the open-center booster (4) is connected to the control element (20) by way of a hydraulically unlockable check valve (40) which latter is opened when the pressure of the front-wheel brake circuit (2) communicating with the open-center booster (4) exceeds a predetermined threshold value.

* * * * *